Aug. 5, 1969     L. KADLEC     3,460,011

TEMPERATURE COMPENSATED LIQUID QUANTITY CAPACITOR

Filed April 20, 1967

INVENTOR
Ladislav Kadlec
BY Edwin E. Greigg
ATTORNEY

United States Patent Office 3,460,011
Patented Aug. 5, 1969

3,460,011
TEMPERATURE COMPENSATED LIQUID QUANTITY CAPACITOR
Ladislav Kadlec, Flushing, Queens, N.Y., assignor to Simmonds Precision Products, Inc., Tarrytown, N.Y., a corporation of New York
Filed Apr. 20, 1967, Ser. No. 632,359
Int. Cl. H01g 7/04
U.S. Cl. 317—247          6 Claims

ABSTRACT OF THE DISCLOSURE

A device providing for temperature compensation in a capacitance sensing probe for liquid measurements which introduces a compensating capacitor in parallel with the sensing capacitor. The compensating capacitor utilizes one of the plates of the sensing capacitor together with an additional electrode connected to a reference element having a coefficient of expansion substantially lower than that of the electrodes of the sensing capacitor. The capacitance decrease resulting from the sensor contraction due to temperature change will be offset by a corresponding capacitance increase in the compensating capacitor.

---

This invention relates to liquid quantity gauges in which the electrodes of a capacitor are arranged within the container for the liquid, cryogen, for example, such that, as the quantity of the liquid in the container changes the proportion of gas to liquid as the dielectric of the capacitor, the capacitance changes.

In such capacitive sensor devices the capacitance between two cylindrical plates is proportional to the space between these plates. If these plates are fabricated of the same material, it becomes apparent that because of temperature contraction or expansion the space between these plates will not change, since the radial movement of both plates expand or contract in proportion to the coefficient of expansion of the alloy material, and the capacitance per inch of sensor length will then remain the same. The length of the capacitor and sensor, however, will change, and this change will result in a reduction in effective capacitance. A compensation technique is therefore required to offset this reduction in effective capacitance. This required compensation would be relatively simple if the entire length of the sensor were to be at one temperature when used for cryogenic measurements. In this case the technique would simply reduce to the application of a shrinkage factor to compensate for the contraction of the sensor. In a system using high temperature ullage gas for tank pressurization, however, it becomes necessary to take into consideration the temperature gradient along that length of the sensor exposed to the gas. It is the purpose of this invention, therefore, to provide such a technique.

By introducing a temperature compensation capacitance as a correction factor, the propellant utilization system responds only to liquid level changes and functions without regard to temperature gradients along the sensing probe. Further, the invention eliminates any errors resulting from the change in proportionality of the coefficients of expansion due to wide temperature excursion.

Accordingly, the object of this invention is to provide a temperature compensation technique for cryogenic mass sensing capacitance systems which results in a linear capacitance output regardless of ullage tank temperature gradient.

It is another object of this invention to provide temperature compensation for capacitance sensors which will allow such sensors to obtain higher accuracies and higher slope ratios.

It is a further object of this invention to provide a capacitance sensor which is compensated for temperature yet does not involve any increase in sensor weight nor entail any fabrication problems associated with the inner electrode element.

It is still a further object of the invention to provide a capacitance sensor which is compensated for temperature changes along its entire length without limiting the diameter ratio between the electrode elements and thus permits higher capacitance outputs.

In accordance with one embodiment employing the concepts of this invention, temperature compensation is accomplished by an increase in capacitance as a function of reduction in sensor length. The invention proposes the introduction of a capacitor in parallel with the sensing capacitance whose value varies as a function of ullage gas temperature for providing the necessary compensation. This compensating capacitance is designed to utilize one of the cylindrical electrode plates from the sensor together with an additional electrode plate connected with a reference element which has a lower coefficient of expansion than that of the electrode plates of the sensor. The capacitance decrease resulting from sensor contraction will then be offset by a corresponding capacitance increase in the compensating capacitor.

Other objects and advantages will become apparent from a detailed study of the following specification and drawings, in which.

Figure 1:
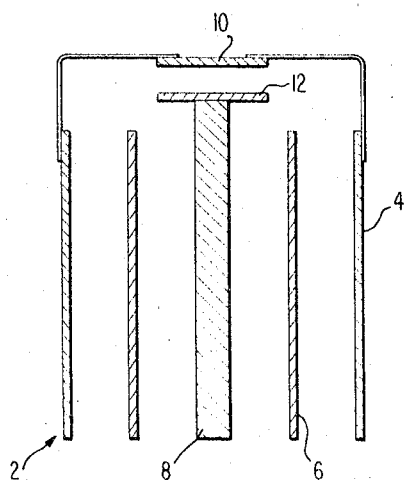
FIG. 1 is a cross-sectional view of one embodiment employing the principles of this invention.

Referring now to FIG. 1, a capacitance sensor 2 having an outer cylindrical electrode element 4 and an inner cylindrical electrode element 6 is of an overall length necessary to accommodate the total height of a tank (not shown) in which the sensor 2 is placed. The total capacitance of an immersed sensor is given by the expression:

$$C_\mathrm{T} = A \left[ \frac{h_\mathrm{a}}{\log \frac{D}{d}} + \frac{h_\mathrm{c}(K-1)}{\log \frac{D}{d}} \right]$$

where:

$C_\mathrm{T}$=capacitance output of immersed sensor
$A$=constant
$D, d$=diameters of sensor electrode elements
$K$=dielectric constant of cryogen
$h_\mathrm{a}$=total height of sensor
$h_\mathrm{c}$=height of cryogen.

It is obvious from the above expression that the only variable that is affected by the ullage gas temperature gradient is $h_\mathrm{a}$. The introduction of a capacitor in parallel with the sensing capacitance whose value varies as a function of ullage gas temperature will then provide the necessary compensation. In the embodiment shown in FIG. 1 the compensating capacitor is seen to comprise two plates 10 and 12. One of these plates 10 is mechanically fastened by suitable means to the outer electrode element 4 with which it is electrically common. The other plate 12 is electrically common with the inner electrode element 6, but is mechanically fastened to a reference element 8, the latter being made from an alloy of lower coefficient of expansion than the alloy from which the electrodes 4 and 6 are made. For example, with both the electrode elements 4 and 6 of the sensor 2 made from an alloy such as aluminum, for example, the change from 293° K. to 20° K. will be in the order of 415×10⁻⁵ in/in of sensor contraction. Now, if the diameter ratio of the outer and inner electrode elements 4 and 6 is sufficiently high so as to provide a total capacitance of 1000 picofarads, the capacitance change due to a reduction in sensor length is approximately 4.2 μμf. while the total mass sensor contraction is 1.7 inches. The compensating reference element 8 on the other hand is made from an alloy which includes stainless steel, and its total contraction will be approximately half that of the aluminum electrode elements or .85 inch thus causing the plates 10 and 12 to approach each other during contraction of the sensor 2. A capacitance decrease will result from the sensor's contraction which will be offset by a capacitance increase in the compensating capacitor.

The capacitance between two parallel plates is given by the formula:

$$C = \frac{GKA}{d}$$

where:

C = total plate capacitance
G = constant
K = dielectric constant
A = plate area
d = plate distance Then it follows that the formula for the compensating capacitor when the sensor 2 is completely immersed must be:

$$C + 4.2 = \frac{GKA}{d - .85}$$

When $d$ equals 1 inch, solving the above formula for A indicates that the compensating capacitor is approximately 3.6 in.² in area or approximately the diameter of the outer electrode element 4. It should be noted that because this plate area is small, the effects of cryogen temperature are negligible since the plate diameter is decreased by only .4%, however, even this slight error can be eliminated by plate geometry or plate profiling as well known in the art. Plate profiling can also be used to compensate for the variance in coefficient of expansion due to temperature.

Figure 2:
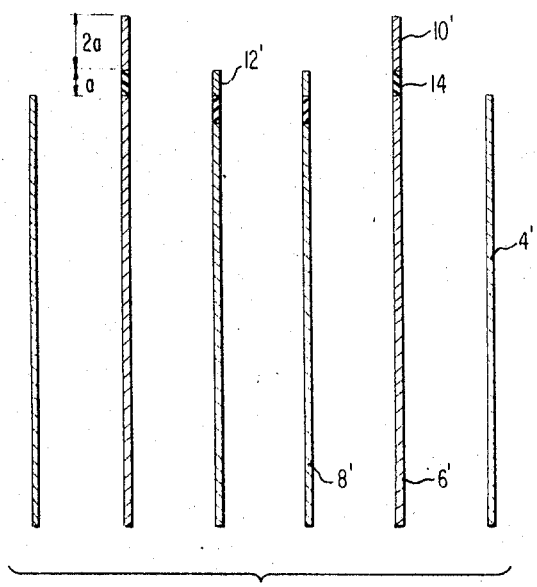
FIG. 2 is a cross-sectional view of another embodiment employing the principles of this invention.

In FIG. 2 the compensating capacitor is shown utilizing cylindrical plates rather than parallel plates. The reference element 8' is in the form of a cylinder having a band 14 of suitable insulating material separating an end portion 12' which forms the inner electrode cylindrical plate of the compensating capacitor. The outer cylindrical electrode 10' of the compensating capacitor is formed in a similar fashion by the extension of the inner electrode element 6' of the sensor 2'. The two electrode elements 6' and 10' are separated by an insulating band 14 in the same manner that the inner electrode 12' is separated from the reference element 8'. As shown in FIG. 2, the outer electrode element 10' of the compensating capacitor which is connected to the electrode 6' has a length which is twice that of the compensating capacitor's inner electrode element 12' connected to the reference element 8'. For example, by the above analysis, the length of the plate 10' can be 1.7 inches whereas the length of plate 12' can be .85 inch. The analysis above described for the parallel plate compensating capacitor shown in FIG. 1 is also valid for the cylindrical plate arrangements shown in FIG. 2.

Figure 3:
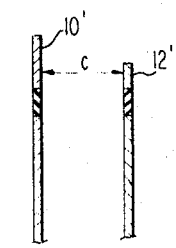
FIG. 3 shows the electrodes of the compensating capacitor shown in FIG. 2 in their contractive position.

The relation between the cylindrical electrode plates 10' and 12' under conditions of contraction due to temperature change is shown in FIG. 3. Because the compensating reference element 8' has a lower coefficient of expansion namely half of that for the electrode elements 4' and 6', the two electrodes 10' and 12' forming the compensating capacitor will then oppose one another and a capacitance will be developed therebetween. This resulting capacitance between the places 10' and 12', which is dependent upon the length of the sensor 2', will compensate for a decrease in the sensor capacitance as a result of its reduction in length.

Figure 4:
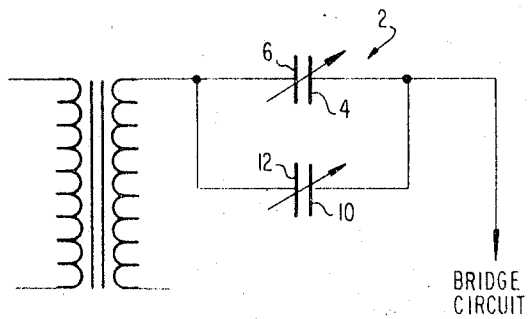
FIG. 4 is a circuit diagram illustrating the plate connections of the respective capacitors.

FIG. 4 shows the compensating capacitor and the sensing or probe capacitor of the sensor 2 connected in parallel for use with a conventional rebalancing servo bridge circuit (not shown) but known to those skilled in the art and described in Patent No. 2,981,105 issued to F. L. Ryder on April 25, 1961. As in the case of the parallel plate arrangement previously mentioned, plate profiling of the cylindrical electrodes 10', 12' can be employed to compensate for the slight errors owing to the non-linearity of the coefficient of expansion due to temperature as well as eliminating the effects to temperature on the compensating capacitance output.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What is claimed is:

1. In a capacitive type liquid quantity measuring probe having inner and outer electrodes, the combination comprising; a compensating capacitor having first and second spaced electrodes, a reference compensating element connected to said first electrode and having a coefficient of expansion substantially lower than that of said electrodes of said probe, said second electrode mechanically connected to one of said electrodes of said probe whereby the decrease in capacitance resulting from the contraction of said probe is offset by a corresponding increase in capacitance in said compensating capacitor.

2. In a capacitive type liquid quantity measuring probe having inner and outer electrodes, the combination comprising; a compensating capacitor electrically connected in parallel with said capacitive probe and having first and second spaced electrodes, said first electrode mechanically connected to a reference compensating element having a coefficient of expansion which is substantially lower than the coefficient of expansion of said inner and outer electrodes, said second electrode mechanically connected to one of said electrodes of said capacitive probe whereby the capacitance decrease resulting from contraction of said capacitive probe will be offset by a corresponding capacitance increase in said compensating capacitor.

3. In a capacitive type liquid quantity measuring probe having inner and outer electrodes, the combination comprising; a compensating capacitor electrically connected in parallel with said capacitive probe and having first and second space electrodes, said first electrode forming a plate secured to a compensating reference element having a coefficient of expansion substantially lower than that of said inner and outer electrodes, said reference element coaxially positioned with respect to said inner electrode, and said second electrode forming a plate spaced above said first electrode and mechanically connected to one of said electrodes of said capacitive probe, whereby the capacitance decrease resulting from contraction of said capacitive probe is offset by a corresponding capacitance increase in said compensating capacitor.

4. In a capacitive type liquid quantity measuring probe having inner and outer electrodes, the combination comprising; a compensating capacitor electrically connected in parallel with said capacitive probe and having first and second spaced electrodes, said first electrode forming the end portion of a cylindrical reference compensating element having a coefficient of expansion substantially lower than that of said inner and outer electrodes, first insulating means separating said first electrode from the main portion of said reference compensating element, said second electrode forming the end portion of one of said electrodes of said capacitive probe, second insulating means separating said second electrode from the main portion of said one of said electrodes of said capacitive probe, whereby the capacitance decrease resulting from the contraction of said capacitance probe is offset by a corresponding capacitance increase in said compensating capacitor.

5. In a capacitive type liquid quantity measuring probe having inner and outer electrodes, the combination comprising; a compensator capacitor having first and second spaced electrodes in offset relation, a cylindrical reference compensating element positioned coaxially with respect to said inner electrode and having a coefficient of expansion substantially lower than that of said inner and outer electrodes, an end portion of said compensating element forming said first electrode and an end portion of one of said electrodes of said probe forming said second electrode, whereby said first and second electrodes become aligned upon contraction of said probe and the decrease in capacitance resulting therefrom in offset by a corresponding increase in capacitance in said compensating capacitor.

6. In a capacitive type liquid quantity measuring probe having inner and outer electrodes, the combination comprising; a compensating capacitor electrically connected in parallel with said probe and having first and second spaced electrodes in offset relation, a cylindrical reference compensating element positioned coaxially with respect to said inner electrode and having a coefficient of expansion substantially lower than that of said inner and outer electrodes, an end portion of said compensating element forming said first electrode, and an end portion of said inner electrode of said probe forming said second electrode, whereby said first and second electrodes become aligned upon contraction of said capacitive probe, and the decrease in capacitance resulting therefrom is offset by a corresponding increase in said compensating capacitor.

References Cited
UNITED STATES PATENTS 3,192,455  6/1965  Bergeson _____ 317—247

LEWIS H. MYERS, Primary Examiner

ELLIOT GOLDBERG, Assistant Examiner

U.S. Cl. X.R.

317—248